(No Model.)

W. A. HANCE.
BICYCLE.

No. 468,994. Patented Feb. 16, 1892.

Witnesses:
Harry S. Rohrer
W. Kimberly Schoff

Inventor:
William A. Hance
by Miles & Greene,
Attorneys.

THE NORRIS PETERS CO., PHOTO-LITHO., WASHINGTON, D. C.

UNITED STATES PATENT OFFICE.

WILLIAM A. HANCE, OF FREEPORT, ILLINOIS, ASSIGNOR TO THE STOVER BICYCLE MANUFACTURING COMPANY, OF SAME PLACE.

BICYCLE.

SPECIFICATION forming part of Letters Patent No. 468,994, dated February 16, 1892.

Application filed September 1, 1890. Serial No. 363,627. (No model.)

*To all whom it may concern:*

Be it known that I, WILLIAM A. HANCE, a resident of Freeport, in the county of Stephenson and State of Illinois, have invented certain new and useful Improvements in Bicycles; and I do hereby declare the following to be a full, clear, and exact description of the invention, such as will enable others skilled in the art to which it pertains to make and use the same.

My invention relates to improvements in bicycles of that class in which the power of the operator is applied by means of rotating cranks and the motion of the cranks is communicated to the driven wheel by means of gearing connecting the cranks with the axle of the wheel.

The invention is fully described and explained in this specification, and shown in the accompanying drawings, in which—

Figure 1:
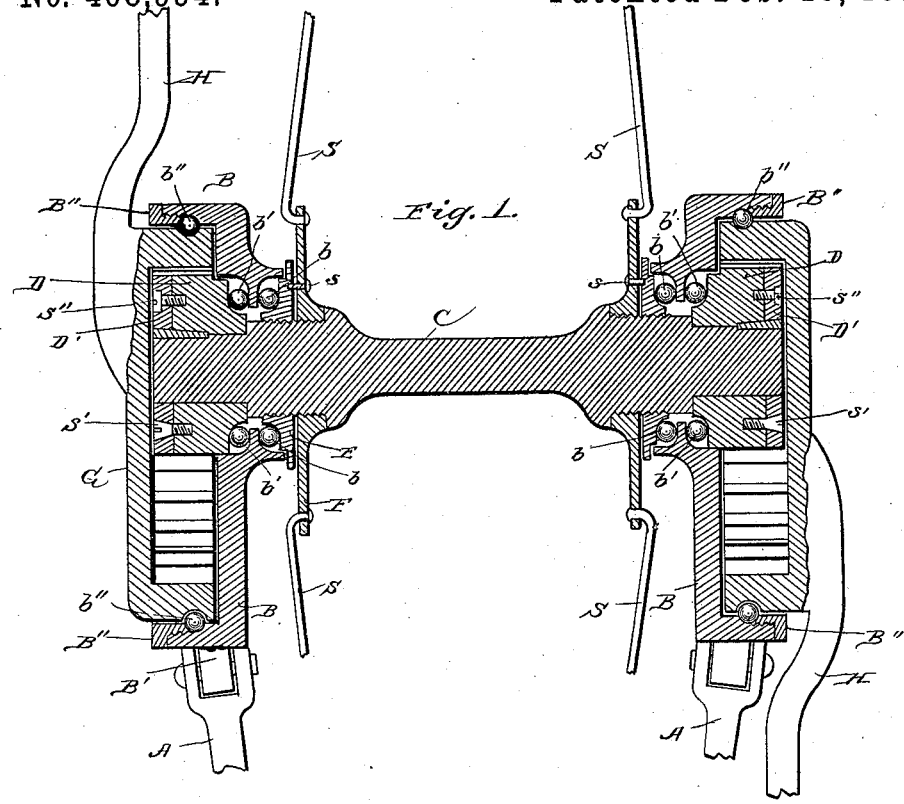
Figure 2:
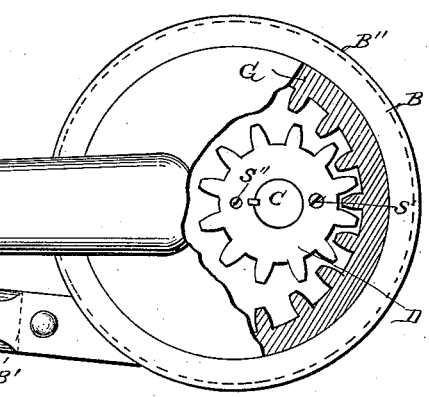

Figure 1 is a view partly in horizontal section and partly in top plan, the plane of section being through the axis of the driven wheel; and Fig. 2 is a side elevation of the parts shown in Fig. 1.

In the views, A A are two rigidly-connected branches of the rear fork of a bicycle, and B B are cylindrical boxes rigidly fastened to the ends of the branches of the fork in any desired manner, but preferably by means of lugs B', to which the ends of the branches are bolted. The cylindrical boxes B B have a common horizontal axis, and their outer ends are open for the reception of operating parts, which will be described in detail hereinafter. Each of the boxes B B has in its inner wall a circular opening eccentric with reference to the axis of the box and preferably in rear thereof, the centers of the two openings being on a line parallel with the common axis of the two boxes and the openings being designed to admit the axle C of the rear wheel of the machine.

On the ends of the axle are rigidly secured in any desired manner two pinions D D, and at suitable distances from the inner faces of the pinions plates E E are adjustably fastened upon the axle, preferably by internally screw-threading the plates and externally screw-threading the axle in the manner shown in Fig. 1. The axle is held in place in the box B by means of two sets of anti-friction balls $b\ b'$ at each end of the axle, and necessary adjustment of the parts for taking up wear and holding the axle in the exact position desired may be accomplished by changing the position of each of the plates E upon the axle. Plates F F are rigidly fastened upon the axle at a suitable distance from the center, and the adjusting-plates E E and spokes S have their inner ends fastened to the plates F and their outer ends to the rim of the wheel, the two plates F F and the axle C forming, in fact, the hub of the wheel.

Within each of the boxes B is journaled an internal gear G, engaging a corresponding pinion D and held in place by means of anti-friction balls $b''$, necessary adjustment for taking up the wear of the balls and other bearings being secured through the use of a ring B'', screwed into the outer end of each of the boxes in the manner shown in Fig. 1. Each of the internal gears G is preferably a cylindrical box having its inner end open and its outer end closed, as shown in Fig. 1, the closing of the outer end of the gearing being a convenient means of protecting the working parts of the mechanism from dust. On each of the internal gears G G is formed a crank H, provided at its free end with a pedal of any desired construction, the parts being preferably so arranged that the cranks stand in opposite directions from the common axis of the two gears G G, which is of course coincident with the axis of the boxes B B.

It is evident from the foregoing description of the parts of this machine that the cranks rotate in unison about a common axis, their motion being precisely the same as if they were joined by a rigid axle, that the motion of the cranks and the gears G G in a given direction rotates the pinions D D in the same direction, and that the speed of rotation of the pinions is greater than that of the internal gears. This is therefore a multiplying gear of the greatest simplicity of construction, and consequently of low cost and great durability. In practical operation the fact that the axis of rotation of the cranks is in front of the axis of the wheel constitutes a very important advantage over the ordinary construction of devices of this class in which the axis of rotation of the cranks is coincident with the axis of the wheel. Moving forward the axis of rotation of the cranks however slightly renders it possible to move the saddle forward to a corresponding extent, thereby bringing the weight of the rider in front of the axis of the rear wheel and adding greatly to the stability of the machine.

Each of the pinions D D may be a single piece, if desired; but I have found it an advantage to add to each of the pinions a supplemental toothed plate D', forming a part of the pinion, the two parts D D' of each pinion being susceptible of slight relative rotary adjustment for the purpose of taking up the wear of the teeth, the two parts being secured in any desired position by means of set-screws $s''$ and the adjustment itself being preferably effected by means of coned screws $s'$.

Having now described my invention and explained its operation, what I claim as new, and desire to secure by Letters Patent, is—

1. The combination, with the driven wheel of a bicycle and its axle, of suitably-supported pedal-bearing cranks having their axis of rotation in front of the axis of the wheel, and gearing connecting said cranks and said axle, substantially as and for the purpose set forth.

2. The combination, with the rear fork A of a bicycle, of cylindrical boxes B B, fastened to the ends of the branches of said fork, the internal gears G G, journaled in said boxes and provided with pedal-bearing cranks H H for their rotation, the axle C, supported eccentrically in said boxes in the rear of the center thereof, the pinions D D, formed on said axle and engaging said internal gears, and anti-friction balls holding the co-operating parts in their proper relative positions, substantially as and for the purpose set forth.

3. The combination, with the fork A, boxes B, and the internal crank-bearing gears G within the boxes, of the axle C in the rear of the axis of rotation of the cranks, the pinion D, operated by the gears G, the balls $b\ b'$, and the adjusting-plate E, substantially as and for the purpose set forth.

In testimony whereof I have signed this specification in the presence of two subscribing witnesses.

WILLIAM A. HANCE.

Witnesses:
R. H. WILES,
ALFRED ZAPF.